US007930366B2

(12) United States Patent
Sakaguchi et al.

(10) Patent No.: US 7,930,366 B2
(45) Date of Patent: *Apr. 19, 2011

(54) INFORMATION SERVICING METHOD, RECORDING MEDIUM RECORDING WITH PROGRAMS FOR REALIZING THE METHOD, AND INFORMATION SERVICING SYSTEM

(75) Inventors: Hironobu Sakaguchi, Tokyo (JP); Ken Narita, Tokyo (JP); Keizo Kokubo, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 944 days.

This patent is subject to a terminal disclaimer.

(21) Appl. No.: 11/220,661

(22) Filed: Sep. 8, 2005

(65) Prior Publication Data
US 2006/0069748 A1    Mar. 30, 2006

Related U.S. Application Data

(63) Continuation of application No. 09/764,408, filed on Jan. 19, 2001, now Pat. No. 6,961,747.

(30) Foreign Application Priority Data

Jan. 20, 2000    (JP) ................................ 2000-012314

(51) Int. Cl.
*G06F 15/16*    (2006.01)
(52) U.S. Cl. ........ 709/219; 709/203; 709/217; 709/218; 709/227; 709/229; 715/963; 715/744; 715/747; 715/745; 715/730; 715/867
(58) Field of Classification Search .................. 709/219, 709/203, 217, 218, 227, 229; 715/867, 744, 715/747, 745, 963, 730
See application file for complete search history.

(56) References Cited

U.S. PATENT DOCUMENTS

| 5,727,129 | A | * | 3/1998 | Barrett et al. .................... 706/10 |
| 5,737,619 | A | * | 4/1998 | Judson .......................... 715/236 |
| 5,740,549 | A |   | 4/1998 | Reilly et al. |
| 5,768,508 | A | * | 6/1998 | Eikeland ....................... 709/202 |
| 5,819,284 | A |   | 10/1998 | Farber et al. |
| 5,828,837 | A | * | 10/1998 | Eikeland ....................... 709/202 |

(Continued)

FOREIGN PATENT DOCUMENTS

JP    07028616    1/1995

(Continued)

OTHER PUBLICATIONS

Ishikawa, K., "The Latest Trend of Internet! Arm with Information by Push Technology!," Internet Magazine, No. 31, pp. 278-289, Aug. 1, 1997.

(Continued)

*Primary Examiner* — Dohm Chankong
(74) *Attorney, Agent, or Firm* — Greenblum & Bernstein, P.L.C.

(57) ABSTRACT

An information servicing method for communicating information between a server and a client terminal through a network, comprising: deciding whether a predetermined time period has elapsed without user input; switching a prevailing processing to a background processing when it is decided that the no user input has occurred during the predetermined time period; transmitting to the server personal information comprising user preference data and/or a schedule, registered in advance, each time the prevailing processing becomes background processing; and displaying an answer corresponding to the transmitted personal information when the answer is received from the server, the answer comprising push information correlating to the personal information.

22 Claims, 8 Drawing Sheets

U.S. PATENT DOCUMENTS

| | | | |
|---|---|---|---|
| 5,855,006 A * | 12/1998 | Huemoeller et al. | 705/9 |
| 5,913,040 A | 6/1999 | Rakavy et al. | |
| 5,964,839 A * | 10/1999 | Johnson et al. | 709/224 |
| 6,044,403 A | 3/2000 | Gerszberg et al. | |
| 6,067,565 A * | 5/2000 | Horvitz | 709/218 |
| 6,119,098 A * | 9/2000 | Guyot et al. | 705/14 |
| 6,237,022 B1 | 5/2001 | Bruck et al. | |
| 6,237,039 B1 * | 5/2001 | Perlman | 709/237 |
| 6,285,985 B1 | 9/2001 | Horstmann et al. | |
| 6,314,451 B1 | 11/2001 | Landsman et al. | |
| 6,317,780 B1 * | 11/2001 | Cohn et al. | 709/217 |
| 6,317,789 B1 | 11/2001 | Rakavy et al. | |
| 6,360,336 B1 | 3/2002 | Christensen et al. | |
| 6,363,419 B1 | 3/2002 | Martin et al. | |
| 6,374,145 B1 | 4/2002 | Lignoul | |
| 6,442,529 B1 | 8/2002 | Krishan et al. | |
| 6,463,457 B1 | 10/2002 | Armentrout et al. | |
| 6,480,830 B1 | 11/2002 | Ford et al. | |
| 6,507,351 B1 | 1/2003 | Bixler et al. | |
| 6,516,421 B1 | 2/2003 | Peters et al. | |
| 6,539,429 B2 | 3/2003 | Rakavy et al. | |
| 6,549,939 B1 | 4/2003 | Ford et al. | |
| 6,580,830 B1 * | 6/2003 | Sato et al. | 382/238 |
| 6,687,678 B1 * | 2/2004 | Yorimatsu et al. | 705/8 |
| 6,754,697 B1 * | 6/2004 | Berstis | 709/217 |
| 6,769,019 B2 | 7/2004 | Ferguson | |
| 6,807,558 B1 | 10/2004 | Hassett et al. | |
| 7,111,251 B2 * | 9/2006 | Komai | 715/844 |
| 2003/0212992 A1 | 11/2003 | Ronning | |

FOREIGN PATENT DOCUMENTS

| | | |
|---|---|---|
| JP | 9-163352 | 6/1997 |
| JP | 9-244981 | 9/1997 |
| JP | 9-321894 | 12/1997 |
| JP | 10-097575 | 4/1998 |
| JP | 10-240828 | 9/1998 |
| JP | 10-240829 | 9/1998 |
| JP | 11-110410 | 4/1999 |
| JP | 11161588 | 6/1999 |
| JP | 11-272574 | 10/1999 |
| JP | 11-272685 | 10/1999 |
| JP | 11511574 | 10/1999 |
| WO | 97/07656 | 3/1997 |
| WO | 9847090 | 10/1998 |
| WO | 99-38079 | 7/1999 |
| WO | 0062463 | 10/2000 |

OTHER PUBLICATIONS

Shido, M., "Push Technology Solving a Flood of Information," Nikkei Computer, No. 414, pp. 216-223, Mar. 31, 1997.
Yoshida, I., "[The Latest] Introduction of Information Service in Push Manner," Net PC, No. 8, pp. 115-124, Aug. 1, 1997.
English Language Abstract of JP 9-321894.
English Language Abstract of JP 9-244981.
English Language Abstract of JP10-97557.
English Language Abstract of JP9-272574.
English Language Abstract of JP11-272685.
English Language Abstract of JP10-240828.
English Language Abstract of JP10-240829.
English Language Abstract of JP9-163352.
English Language Abstract of JP11-110410.
English Language Abstract of JP11-161588.
English Language Abstract of JP 9-321894.
English Language Abstract of JP11-511574.

* cited by examiner

FIG. 2A

PREFERENCE DATA

HOBBY, FAVORITE SINGER, FAVORITE STAR,
INTERESTING COUNTRY, FAVORITE FOOD,
FAVORITE TV PROGRAM,
FAVORITE STUDY, FAVORITE HOME PAGE,
INFORMATIN ON FRIEND/ACQUAINTANCE,
INFORMATION ON FAMILY, FAVORITE GAME,
GAME BEING PLAYED AND ETC.

FIG. 2B

SCHEDULE

ACTION ITEM, PLAN AND ETC.

FIG. 4A

PATTERN 1

BIRTHDAY/GAME BEING PLAYED  →  BENEFICIAL ITEM
(GAME INFORMATION)

FIG. 4B

PATTERN 2

INTERESTING COUNTRY/  →  TRAVEL PLAN
SCHEDULE OF SUMMER VACATION  (TRAVEL DATA)

FIG. 4C

PATTERN 3

SCHEDULE OF DATE/PRESENT TIME  →  { FAMOUS RESTAURANT
(RESTAURANT GUIDE)
WEATHER FORECAST
(WEATHER DATA) }

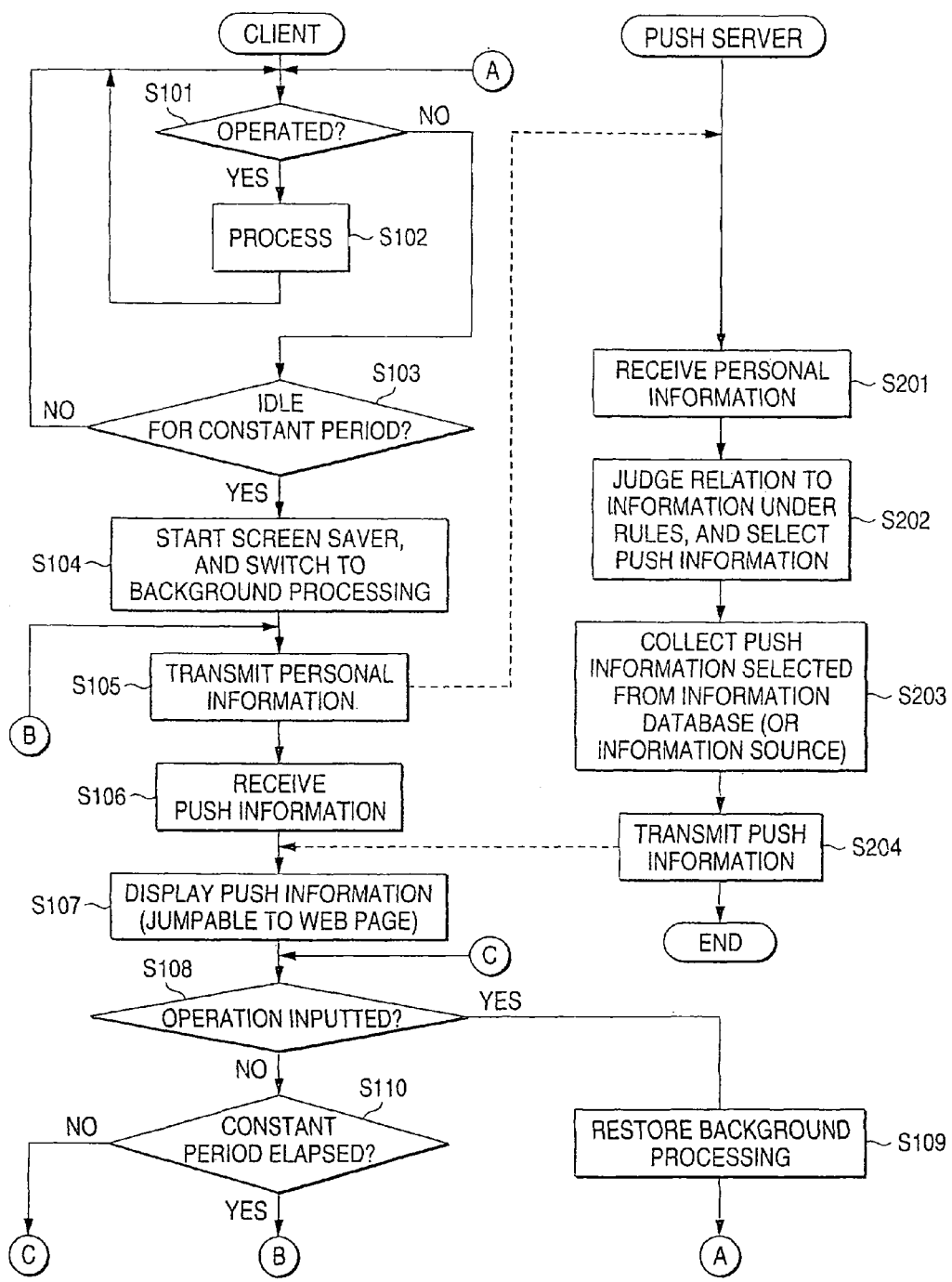

* GAME IMAGE

* SCREEN SAVER STARTED

* PATTERN 1 (OF FIG. 4A) PUSHED

* PATTERN 3 (OF FIG. 4C) PUSHED

* SCREEN SAVER BEING STARTED

* GAME SCREEN RESTORED BY OPERATION

US 7,930,366 B2

INFORMATION SERVICING METHOD, RECORDING MEDIUM RECORDING WITH PROGRAMS FOR REALIZING THE METHOD, AND INFORMATION SERVICING SYSTEM

This application is a continuation of U.S. patent application Ser. No. 09/764,408, filed Jan. 19, 2001 now U.S. Pat. No. 6,961,747, the disclosure of which is expressly incorporated herein by reference in its entirety.

BACKGROUND OF THE INVENTION

1. Field of the Invention

The present disclosure relates to subject matter contained in Japanese Patent Application No. 2000-012314, filed on Jan. 20, 2000, the disclosure of which is expressly incorporated herein by reference in its entirety.

The present invention relates to an information servicing method for servicing online informations beneficial for a user, a recording medium recording with a program for realizing the method, and an information servicing system.

2. Related Art

In the internet, there has already been known the technique to distribute the information such as an advertise beneficial for the user to the terminal of the user. The technique of this kind is disclosed in U.S. Pat. No. 5,740,549. Normally, the screen saver is started for the idle time period in which no input is given for a predetermined time period from the user. Here, the idle time period is effectively exploited for servicing the advertise demanded by the user.

As a similar technique, on the other hand, there is disclosed in Unexamined Published Japanese Patent Application No. 11-511574 a technique by which an advertise is selected from the computer network database on the basis of a preference made by the user so that the received advertise is displayed by the screen saver.

According to the above-specified Publication, an operation to select the information desired by the user in advance is required, and the selected information is serviced to the user through the screen saver. In this case, what is done is to serve the selected information one way through the screen saver. The actual state is that even the selected information can attract no attention so long as it is not beneficial at that time.

As the network infrastructure spreads in recent years, the time period for utilizing the network in the business and private fields has occupied most of daytime. Under this environment, it is expected to service informations in close contact with the life of the user.

SUMMARY OF THE INVENTION

An object of the present invention is to provide an information servicing method for servicing informations beneficial for a user, a recording medium recording with a program for realizing the method, and an information servicing system.

In order to solve the aforementioned problems and to achieve the above-specified object, according to a first aspect of the invention, there is provided an information servicing method for communicating informations between a server and a client terminal through a network, comprising: under the control of said client terminal, deciding whether or not an idle time with no user input has elapsed for a predetermined time period; switching the prevailing processing to a background processing, if the lapse of said predetermined time period is decided, and transmitting a personal information registered in advance, to said server; and displaying an answer corresponding to said transmitted personal information, when said answer is received from said server, and under the control of said server, selecting a push information correlating directly or indirectly to said personal information when said personal information is received from said client terminal; collecting said selected personal information through said network; and transmitting said collected push information as an answer to said client terminal.

According to the first aspect, under the control of said client terminal, a screen saver may be started when said prevailing processing is switched to said background processing. At this time, under the control of said client terminal, said prevailing processing may be returned from said background-ing processing to a main routine in response to the operation of the user while said screen saver is being started.

According to the first aspect, on the other hand, said personal information may contain a schedule indicating an action of the user so that under the control of said server, a push information correlating to each action is selected on the basis of said schedule.

According to the first aspect, on the other hand, said personal information may contain an information indicating the preference of the user so that under the control of said server, a push information correlating to each preference is selected on the basis of said schedule indicating the preference.

According to the first aspect, on the other hand, said personal information may contain a schedule indicating an action and a preference of the user so that under the control of said server, a correlating push information is selected on the basis of said schedule and said preference.

Moreover, a database stored with various push informations may be connected with said server so that under the control of said server, the push information may be selected from said database.

According to the first aspect, on the other hand, under the control of said client terminal, the push informations of a plurality of answers may be simultaneously displayed when said answers are made from said server.

According to the first aspect, on the other hand, said network may be connected with an internet. In this case, under the control of said client terminal, if an operation is made by the user for said displayed answer, a connection may be made with a Web page correlating said operated answer, through said internet.

According to the first aspect, on the other hand, said push information may contain an advertise.

According to a second aspect, on the other hand, there is provided a computer-readable recording medium stored with a program for realizing a method for communicating informations between a server and a client terminal through a network, wherein said computer is programmed: under the control of said client terminal, to decide whether or not an idle time with no user input has elapsed for a predetermined time period; to switch the prevailing processing to a background processing, if the lapse of said predetermined time period is decided, and to transmit a personal information registered in advance, to said server; and to display an answer corresponding to said transmitted personal information, when said answer is received from said server, and under the control of said server, to select a push information correlating directly or indirectly to said personal information when said personal information is received from said client terminal; to collect said selected personal information through said network; and to transmit said collected push information as an answer to said client terminal.

According to the second aspect, said computer may be further programmed: under the control of said client terminal, to start a screen saver when said prevailing processing is switched to said background processing. In this case, said computer may be further programmed: under the control of said client terminal, to return said prevailing processing from said backgrounding processing to a main routine in response to the operation of the user while said screen saver is being started.

According to the second aspect, on the other hand, said personal information may contain a schedule indicating an action of the user so that under the control of said server, a push information correlating to each action is selected on the basis of said schedule.

According to the second aspect, on the other hand, said personal information may contain information indicating the preference of the user so that under the control of said server, a push information correlating to each preference is selected on the basis of said schedule indicating the preference.

According to the second aspect, on the other hand, said personal information may contain a schedule indicating an action and a preference of the user so that under the control of said server, a correlating push information is selected on the basis of said schedule and said preference.

Moreover, a database stored with various push informations may be connected with said server so that under the control of said server, the push information is selected from said database.

According to the second aspect, on the other hand, said computer may be further programmed under the control of said client terminal, to display the push informations of a plurality of answers simultaneously when said answers are made from said server.

According to the second aspect, on the other hand, said network may be connected with an internet. In this case, said computer may be further programmed under the control of said client terminal, to make a connection, if an operation is made by the user for said displayed answer, with a Web page correlating said operated answer, through said internet.

According to the second aspect, on the other hand, said push information may contain an advertisement.

According to a third aspect, on the other hand, there is provided an information servicing system for communicating informations between a server and a client terminal through a network, wherein said client terminal comprises decision means for deciding whether or not an idle time with no user input has elapsed for a predetermined time period; transmission means for switching the prevailing processing to a background processing, if the lapse of said predetermined time period is decided, and for transmitting a personal information registered in advance, to said server; and display means for displaying an answer corresponding to said transmitted personal information, when said answer is received from said server, and wherein said server comprises: selection means for selecting a push information correlating directly or indirectly to said personal information when said personal information is received from said client terminal by said transmission means; collection means for collecting said personal information selected by said selection means, through said network; and answer means for transmitting said push information collected by said collection means, as an answer to said client terminal.

According to the third aspect, said client terminal may start a screen saver when said prevailing processing is switched to said background processing. In this case, said client terminal may return said prevailing processing from said backgrounding processing to a main routine in response to the operation of the user while said screen saver is being started.

According to the third aspect, on the other hand, said personal information may contain a schedule indicating an action of the user so that said server selects a push information correlating to each action on the basis of said schedule.

According to the third aspect, on the other hand, said personal information may contain an information indicating the preference of the user so that said server selects a push information correlating to each preference on the basis of said schedule indicating the preference.

According to the third aspect, on the other hand, said personal information may contain a schedule indicating an action and a preference of the user so that said server selects a correlating push information on the basis of said schedule and said preference.

Moreover, a database stored with various push informations may be connected with said server so that said server selects the push information from said database.

According to the third aspect, on the other hand, said client terminal may display the push informations of a plurality of answers simultaneously when said answers are made from said server.

According to the third aspect, on the other hand, said network may connected with an internet. In this case, said client terminal may make a connection, if an operation is made by the user for said displayed answer, with a Web page correlating said operated answer, through said internet.

According to the third aspect, on the other hand, said push information may contain an advertisement.

BRIEF DESCRIPTION OF THE DRAWINGS

FIGS. 2A and 2B are diagrams for explaining one example of personal information and show one example of the preference data and one example of the schedule of the personal information, respectively;

FIGS. 4A, 4B and 4C are diagrams for patterning and explaining the correlations of information by using an information correlating database in this embodiment, and show patterns 1, 2 and 3, respectively;

FIG. 6 is a flow chart for explaining an operation correlating example between a client and a push server in this embodiment;

DESCRIPTION OF THE PREFERRED EMBODIMENT

One embodiment of the invention will be described in detail with reference to the accompanying drawings.

Figure 1:
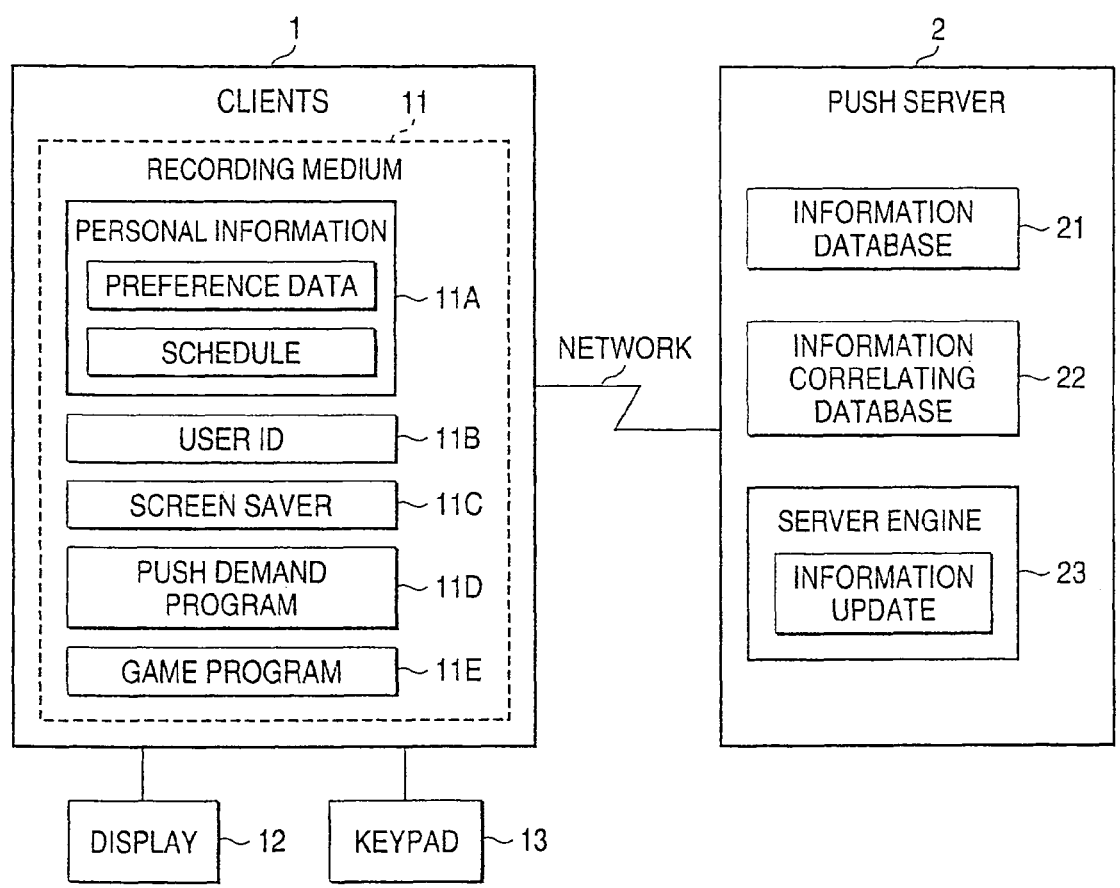
FIG. 1 is a block diagram for explaining an entire system according to an embodiment of the invention.

FIG. 1 is a block diagram for explaining an entire system according to an embodiment of the invention. As shown in FIG. 1, for example, this system connects clients 1 and so on and a push server 2 with a network, through which it makes communications. With this network, there are additionally connected a game server, a server for distributing comics, a server for distributing musics, a server for controlling male exchanges, a server for controlling chats and so on, although not shown.

To this system, on the other hand, there can be applied a technique such as the business network or the internet. Where the business network or the internet is to be applied to the system, there is needed the environment in which the services can be utilized after the authentication of a user was obtained by a dial-up from each client 1 to the closest server. In the case of a connection with the network, this connection has to be made with the provider through a modem.

Here will be further described the individual devices. Each client 1 is provided with a recording medium 11, in which is recorded personal information 11A including preference data and a schedule, a user ID 11A necessary for the user authentication, a screen saver 11C to be started if the user's operation is absent for a constant time period, a push demand program 11D for demanding the push server 2 the push distribution of the information as the screen saver 11C is started, a game program 11E for executing the game, and so on. The recording medium 11 may be exemplified by a hard disk.

The recording medium 11 may be fed with the game program 11E from a disk medium, such as a CD-ROM, a DVD or a floppy disk. The game program 11E indicates an online dedicated game program or an offline dedicated game program.

The user ID 11B is utilized for discriminating the legal user to receive the individual services.

Each client 1 is connected with a display 12 for displaying the image and outputting the sound for the client of each server, and a keypad 13 for the user to input the operations. The various services are provided through the display 12 and are controlled through the keypad 13.

The push server 2 is connected with the network and is provided with an information database 21, an information correlating database 22, a server engine 23 and so on. The push server 2 decides correlation between the informations to be pushed, from the personal information sent at a push demanding time from each client 1, and collects and serves the informations on the basis of the decision. The information database 21 is a database for collecting and registering the latest information for the prepared categories. The information correlating database 22 decides the correlation of the informations to be pushed, from the personal information sent from each client, and specifies the rule for determining the combination of the informations to be pushed, from that decision.

The server engine 23 is an engine for administering the operations of the push server 2 itself, and contains controls for updating the content of the information database 21 periodically or at a proper timing.

The personal information to be registered in each client 1 will now be described. FIGS. 2A and 2B are diagrams for explaining one example of the personal information. Of the personal information, one example of the preference data is shown in FIG. 2A. The preference data include Hobby, Favorite Singer, Favorite Star, Interesting Country, Favorite Food, Favorite TV Program, Favorite Study, Favorite Home Page, Information on Friend/Acquaintance, Information on Family, Favorite Game, and Game Being Played, for example. Here, the preference data naturally include the additional various ones because they indicate the preferences of the user.

For example, Information on Friend/Acquaintance or Information on Family covers Birthday, Address or Place of Employment, and Game Being Played covers the information on whether or not the game is an online one serviced through the network. On the other hand, Favorite Game covers the information such as a favorite game maker or a genre.

Of the personal information, one example of the schedule is shown in FIG. 2B. This schedule includes the general information such as Daily Schedule or Scheduled Action Item.

Figure 3:
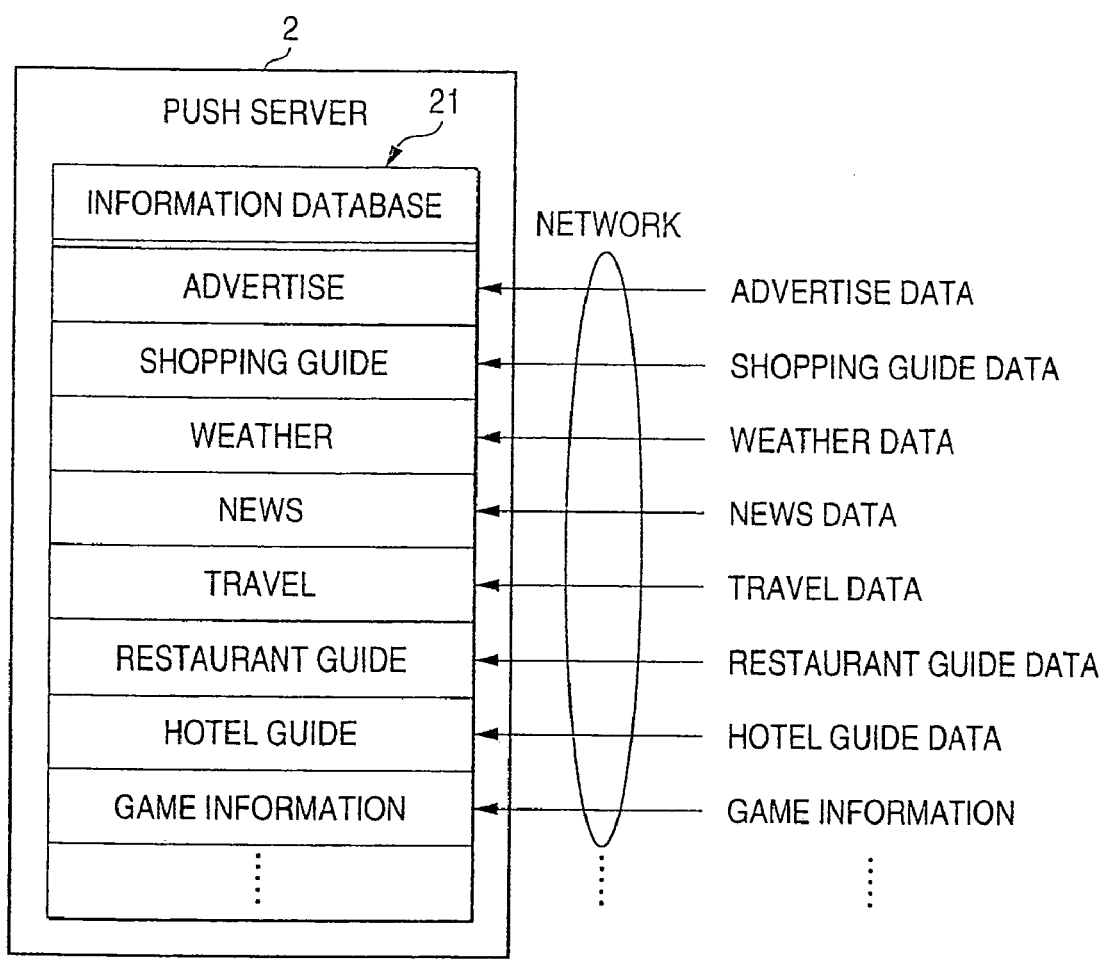
FIG. 3 is a diagram for explaining information examples of different categories to be registered in an information database in this embodiment.

Here will be described the information database 21 in detail. FIG. 3 is a diagram for explaining information examples of different categories to be registered in the information database 21. This information database 21 is stored, as shown in FIG. 3, with: Advertise Data for advertising commodities or enterprises; Shopping Guide Data for guiding shops of individual countries or individual areas; Weather Data for introducing weather forecasts or present weathers of individual areas; News Data of sports, events or politics; Travel Data for guiding domestic or abroad travels; Restaurant Guide Data for Guiding restaurants of individual areas or needs; Hotel Guide Data for guiding hotels of individual areas or needs; or Game information for guiding games of different genres or makers. These data and informations are serviced through the network from other servers, as shown in FIG. 2, and are updated.

Here will be described the functions of the information correlating database 22 in detail. FIGS. 4A, 4B and 4C are diagrams for patterning and explaining the correlations of informations by using the information correlating database 22. FIG. 4A shows Pattern 1. This Pattern 1 implies that from the correlation between the birthday of the user and the title of the game being played on the online, an item beneficial for the game is presented on that birthday.

FIG. 4B shows Pattern 2. This Pattern 2 proposes a reasonable travel plan for the user to make during the summer vacation, from the correlation between a country the user is anxious to visit (or a country interesting the user) and the summer vacation allowed by the user's schedule.

FIG. 4C shows Pattern 3. This Pattern 3 proposes the famous restaurant which can be introduced by the destination and the time zone of the user, from the correlation between the schedule (i.e., place and time) of data allowed by the user's schedule and the present time. If the weather forecast is additionally combined in this case, it is possible to realize the services of a more beneficial information. Where the weather is pushed, there may be prepared a routine comment. If it is forecast to rain outdoors at the destination, it may be set to make an advice "Let's bring an umbrella!".

Patterns 1, 2 and 3 are just examples, and it is arbitrary to correlate three or more kinds of informations or to select the information directly with one kind.

Figure 5:
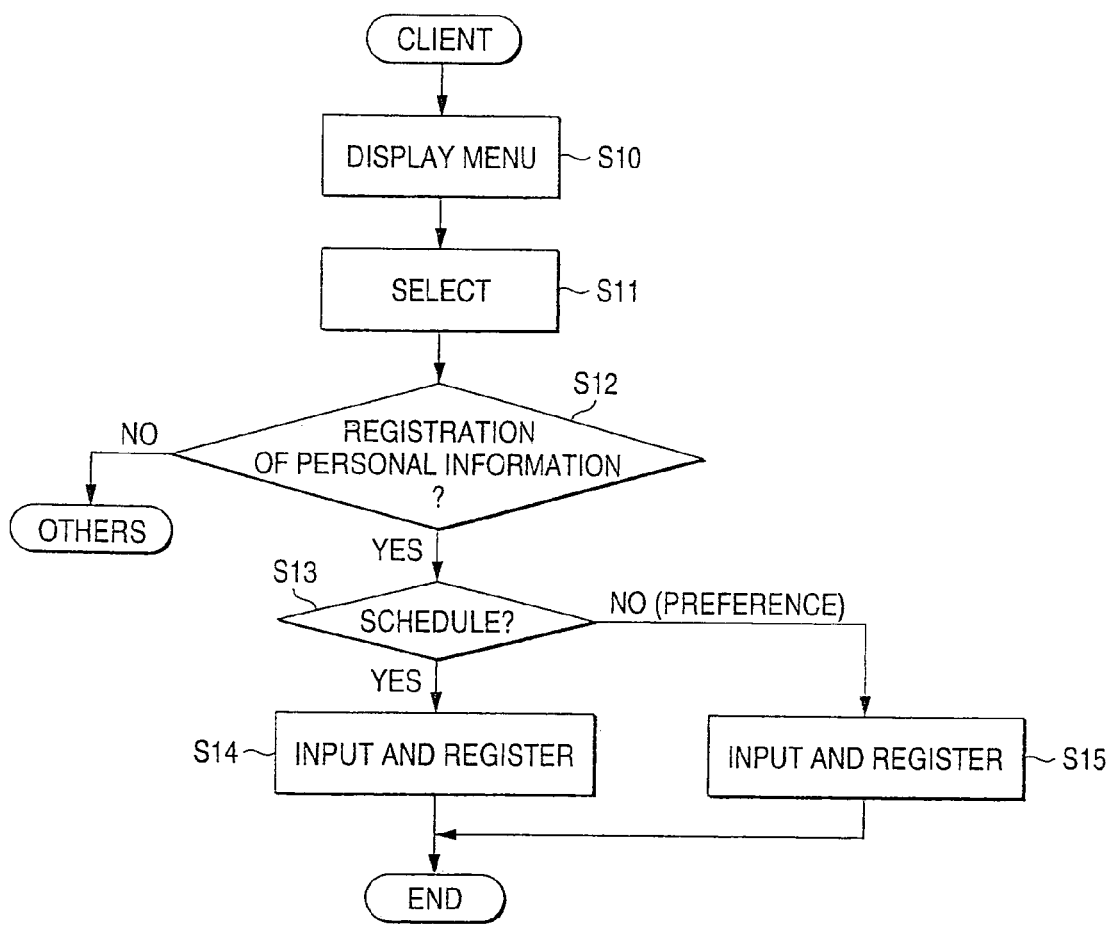
FIG. 5 is a flow chart for explaining an example of operations to register the personal information in this embodiment.

Here will be described the actions according to this embodiment. FIG. 5 is a flow chart for explaining an example of operations to register the personal information in this embodiment, and FIG. 6 is a flow chart for explaining an operation correlating example between the client and the push server.

First of all, a method of registering the personal information will be described with reference to FIG. 5. At each client 1, the menu is displayed at first (at Step S10) by inputting the operations by the user. This menu contains the registration of the personal information. In view of this menu display, the user selects a desired item (at Step S11).

Where the registration of the personal information is selected (on the Yes route of Step S12) through the operations of the user, there is displayed a sub-menu which is divided into the categories of "Schedule" and "Preference" of the user. If the "Schedule" is then selected by the user (on the Yes route of Step S13), the schedule is inputted and registered (at Step S14). Here, the registration contents have already been described with reference to FIG. 2B.

If the "Preference" is selected (on the No route) at Step S13, on the other hand, the preference is inputted and registered. Here, the preference contents have already been described with reference to FIG. 2A.

Thus, the registration at each client 1 is completed.

The push demand and the push distribution method will be described with reference to FIG. 6. At the client 1, in response to the operation input (on the Yes route of Step S101), there are executed a variety of operations (at Step S102). Without the operation input (on the No route of Step S101), it is decided (at Step S103) whether or not the idle time has elapsed for a constant period While the lapse of the constant period is not confirmed (on the No route of Step S103), the routine returns to Step S101. If the lapse of the constant period is confirmed (on the Yes route of Step S103), there is started the screen saver for preventing the burning of the screen. As this screen saver is started, the processing is switched to the background (at Step S104).

Then, the registered personal information is transmitted to the push server 2 (at Step S105), and the routine is on standby till the push information arrives. When the push information is received (at Step S106), it appears on the starting screen of the screen saver so that it is so displayed (at Step S107) as to be visually recognized by the user.

In the display of the push information, a click may be set to jump to the Web page. In this case, the Web page is connected directly from the client 1 by the clicking operation of the user. In this case, the operation input is detected (on the Yes route of Step S108) through the jump to the Web page, the start of the screen saver is interrupted, and the switched background is restored (at Step S109). Then, the routine returns to Step S101.

While no operation is inputted (on the No route of Step S108 after the display of the push information at Step S107 and while no constant period is elapsed (on the No route of Step S110) after the start of the screen saver, the operations of Step S108 and Step S110 are repeatedly executed. If the lapse of the constant period is confirmed, on the other hand, the routine returns to Step S110, and the personal information is transmitted again to the push server 2. If the information database 21 of the push server 2 is updated at this time, the latest information can be acquired real-time.

At the push server 2, on the other hand, if the personal information is received from the client 1 (at Step S201), the correlation of the information is decided, as described with reference to FIG. 4, on the basis of the received personal information, so that the optimum push information is selected (at Step S202) from the decision.

For the correlation of the information, reference is made to the information correlating database 22, and the selection of the push information is made on the basis of the category registered in the information database 21. Especially the selection of the push information contains the case of collecting it from a server (on the network) other than the information database 21. Therefore, the collection of the push information means the operation to collect it from the information source on the network including the information database 21 (at Step S203).

The push information thus collected is transmitted to client 1 that demanded (requested) it.

Here will be described the display transitions of the client 1. FIGS. 7A to 7F are diagrams showing display examples, as transited in response to the push demand, on the client side. Where a game is being played online or offline, for example, at the client 1 (as referred to FIG. 7A), the screen saver is started (as referred to FIG. 7B) if the idling continues for a constant time. At this time, the game is switched to the background.

Figure 7A:
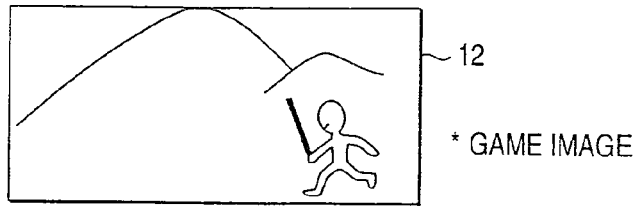
FIGS. 7A to 7F are diagrams showing display examples, as transited in response to the push demand, on the client side in this embodiment.
Figure 7B:
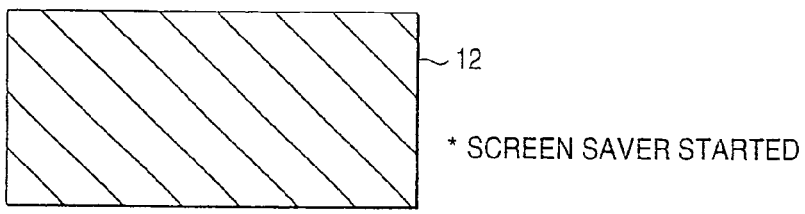
Figure 7C:
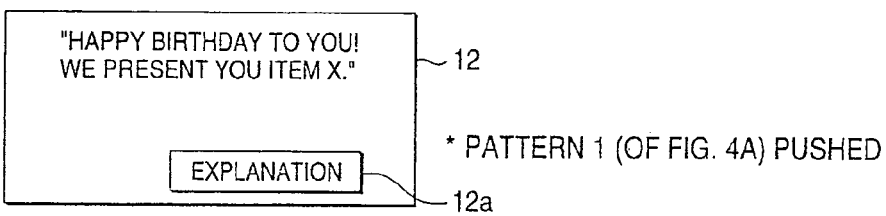
Figure 7D:
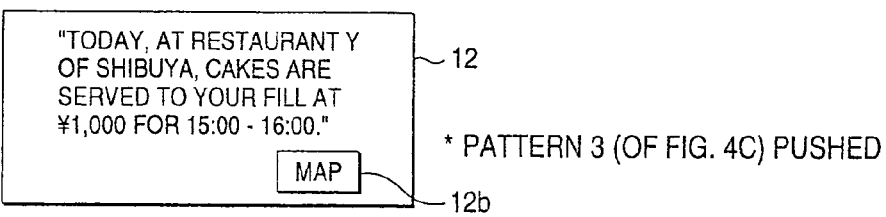
Figure 7E:
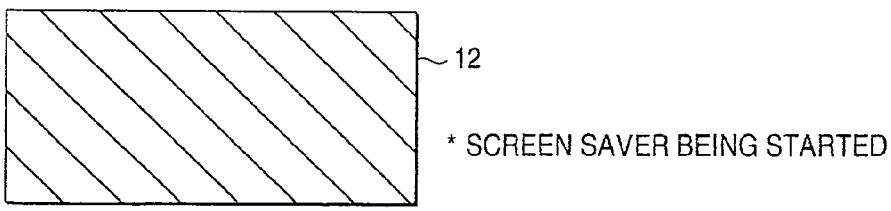
Figure 7F:
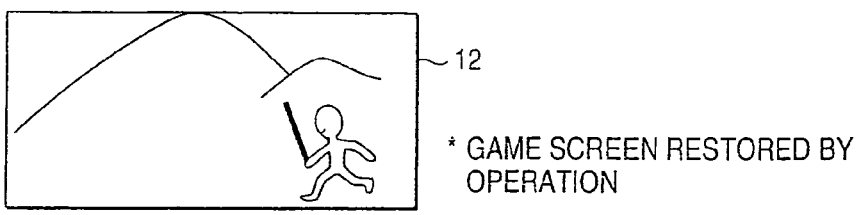

After this, there is displayed on the display screen the push information which is serviced from the push server 2 (as referred to FIG. 7C). Specifically, it is the birthday of the player, and there is displayed the message "Happy Birthday to You! We Present You Item X."

This Item X is an information beneficial information if it can be utilized in the game being played. Here, an explanation icon 12a can be operated to receive an explanation on the use of Item X from the display (which may contain the sound or may adopt computer graphics).

Subsequently, it is also possible to display a next push information. A plurality of push informations may arrive because the push information is selected from the personal information. The manner how to display the push information may be exemplified by switching the screens sequentially or by arranging the plurality of push informations on the common screen.

It is assumed that the client has a promise of a date and that its plan is scheduled. If this case matches the condition of FIG. 4C, for example, there is push-distributed and displayed on the screen a restaurant guide "Today, at Restaurant Y of Shibuya, Cakes Are Served to Your Fill at \1,000 for 15:00-16:00."

Here, it is possible to display the location of restaurant Y, and its menu by operating a map icon 12b to receive the explanation from the display (which may contain the sound or may adopt computer graphics). Here, the weather forecast cannot be displayed, but a weather mark may be displayed or a weather information may be displayed by the multiple displays.

When the push display of the presentation and the restaurant guide is thus ended, the screen saver is displayed again (as referred to FIG. 7E) while the operation of the player is absent. In response to the operation input of the player, moreover, the screen saver ends, and the original game screen is restored (as referred to FIG. 7F).

Figure 8:
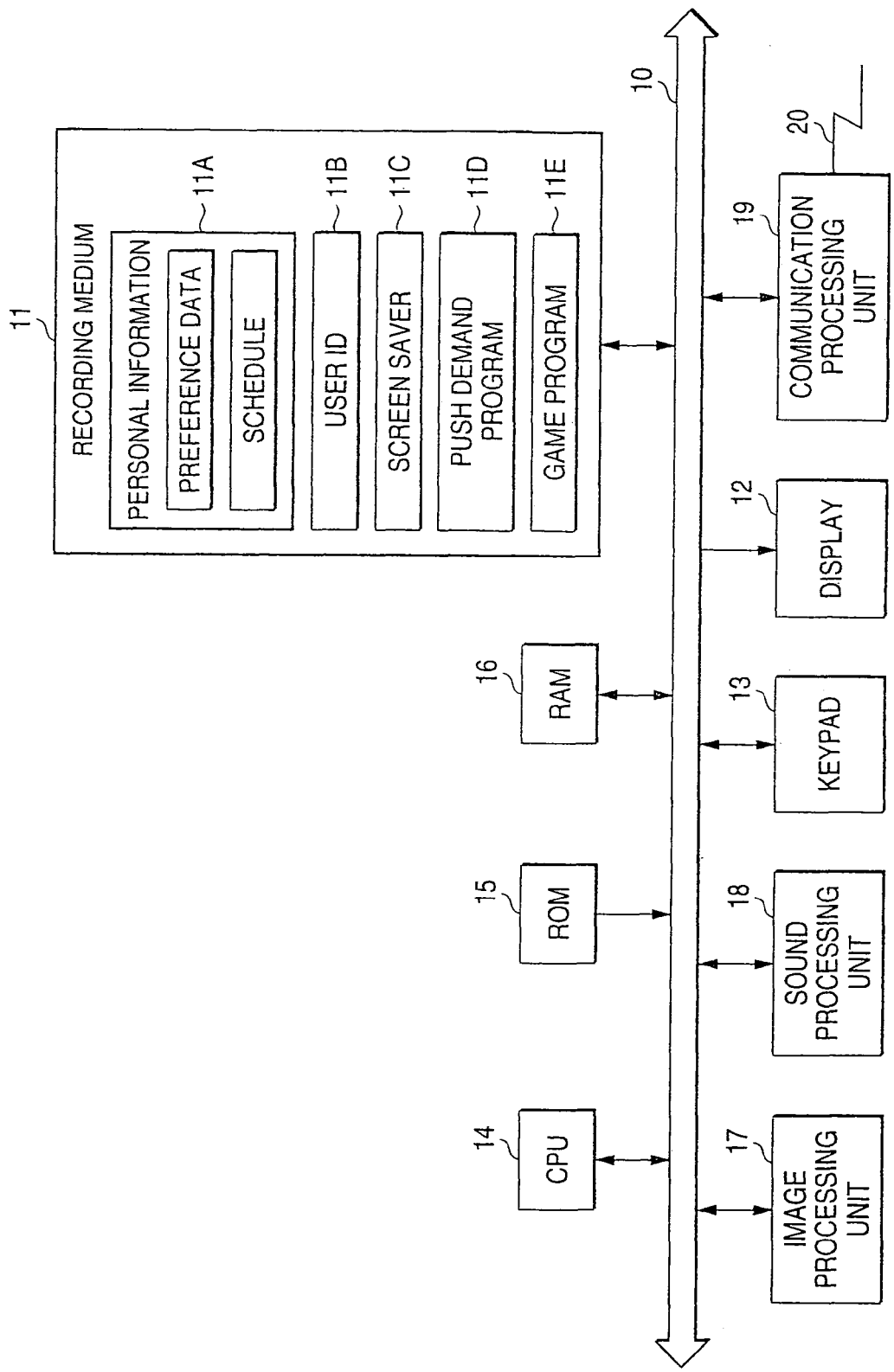
FIG. 8 is a block diagram showing one construction example of the client according to this embodiment.

Here will be briefly described the construction of the game terminal 1. FIG. 8 is a block diagram showing one construction example of the client 1 according to this embodiment. The client 1 is constructed, as shown in FIG. 8, by connecting with an internal bus 10 a CPU 14, a ROM 15, a RAM 16, the recording medium 11, an image processing unit 17, a sound processing unit 18, the keypad 13, the display 12, a communication control unit 19 and so on.

The internal bus 10 is a line for transmitting the address signal or data in the system. The CPU 14 the operations of the client terminal itself as a whole according to the various programs recording in the recording medium 11. The ROM 15 is stored with programs such as the push demanding program or the game program for activating the applications, a variety of parameters and so on.

The RAM 16 is a memory to be used as the work area at the time of executing the various programs. The recording medium 11 may be used, although already described, for storing new programs or data from the network through a line 20 connected with the communication control unit 19. The image processing unit 17 administers the computer graphics processing or the like at the time of making the push information display, the Web page display, the game execution, the comics display and so on. The sound processing unit 18 administers the voice processing or the like at the time of making the push information output, the Web page output, the game execution, the music output and so on.

The keypad 13 is a unit for inputting by the operations of the user. The display 12 is a unit for outputting the image and the sound. The communication control unit 19 is an interface connected with the network via the line 20 for receiving the various services from the network. This communication control unit 19 is equipped therein with a modem, through which the connection with a provider is effected when connected with the network.

As has been described hereinbefore, according to this embodiment, the informations beneficial for the user are serviced with the proper contents so that the information services in close contact with the life of the user can be realized.

As has been described hereinbefore, according to the invention, the informations beneficial for the user are serviced with the proper contents so that the information services in close contact with the life of the user can be realized.

What is claimed:

1. An information servicing method for communicating information between a server and a client terminal through a network, comprising:
    deciding whether a predetermined time period has elapsed without any user input;
    switching a prevailing processing to a background processing when it is decided that no user input has occurred during the predetermined time period;
    transmitting, to the server, each time the prevailing processing is switched to the background processing, personal information comprising at least a schedule of a user, the personal information being registered in advance;
    displaying, on the client terminal, each time the prevailing processing is the background processing, an answer corresponding to the transmitted personal information when the answer is received from the server, the answer comprising push information correlating to the schedule of the user; and
    setting, when the answer is displayed on the client terminal, an input operation of the client terminal that normally switches the prevailing processing, that was switched to the background processing, to the prevailing processing to connect the client terminal with the push information of the answer and to not switch the prevailing processing, that was switched to the background processing, to the prevailing processing,
    wherein the schedule comprises a daily schedule indicating actions of the user and the push information correlates to each of the actions on the basis of the daily schedule.

2. The information servicing method of claim 1, wherein the personal information further comprises user preference data indicating preferences of the user and the push information correlates to each of the preferences on the basis of the schedule.

3. The information servicing method of claim 1, further comprising:
    simultaneously displaying push information of a plurality of answers when the plurality of answers are received.

4. The information servicing method of claim 1, wherein the network is connected to an internet.

5. The information servicing method of claim 4, further comprising:
    connecting, by the client terminal and through the internet, with a web page identified by the push information when the input operation is inputted to the client terminal.

6. The information servicing method of claim 1, wherein the push information comprises an advertisement.

7. The information servicing method of claim 1, wherein the schedule of the user indicates scheduling data allowed by the schedule, and the push information correlates to the scheduling data.

8. A non-transitory computer-readable recording medium stored with a program for communicating information between a server and a client terminal through a network,
    wherein the program executes:
    under control of the client terminal,
        to decide whether a predetermined time period has elapsed, during which no user input has occurred;
        to switch a prevailing processing to a background processing, when it is decided that the no user input has occurred during the elapsed predetermined time period;
        to transmit, to the server, each time the prevailing processing is switched to the background processing, personal information comprising at least a schedule of a user;
        to display, on the client terminal, each time the prevailing processing is the background processing, an answer corresponding to the transmitted personal information when the answer is received from the server, the answer comprising push information correlating to the schedule of the user; and
    to set, when the answer is displayed on the client terminal, an input operation of the client terminal that normally switches the prevailing processing, that was switched to the background processing, to the prevailing processing to connect the client terminal with the push information of the answer and to not switch the prevailing processing, that was switched to the background processing, to the prevailing processing, and
    under control of the server,
        to receive the personal information transmitted from the client terminal;
        to select the push information, the push information correlating to the schedule of the user; and
        to transmit the selected push information as the answer to the client terminal,
    wherein the schedule comprises a daily schedule indicating actions of the user and the push information correlates to each of the actions of the daily schedule.

9. The recording medium of claim 8, wherein the program further executes:
    under the control of the client terminal,
        to start a screen saver when the prevailing processing switches to the background processing.

10. The recording medium of claim 8, wherein the personal information further comprises user preference data indicating preferences of the user and the push information correlates to each of the preferences on the basis of the schedule.

11. The recording medium of claim 8, wherein the program further executes:
    under the control of the client terminal,
        to simultaneously display push information of a plurality of answers when the plurality of answers are transmitted by the server.

12. The recording medium of claim 8, wherein the network is connected to an internet.

13. The recording medium of claim 12, wherein the program further executes:
    under the control of the client terminal,
        to connect the client terminal, through the internet, with a web page identified by the push information when the input operation is inputted to the client terminal.

14. The recording medium of claim 10, wherein the push information contains an advertisement.

15. The recording medium of claim 8, wherein the schedule of the user indicates scheduling data allowed by the schedule, and the push information correlates to the scheduling data.

16. An information servicing system for communicating information, comprising:
- a client terminal, comprising:
  - a determiner that determines whether a predetermined time period has elapsed without any user input;
  - a processing switcher that switches a prevailing processing to a background processing, when the determiner determines that no user input has occurred during the predetermined time period;
  - a transmitter that transmits, to a server, each time the prevailing processing is switched to the background processing, personal information comprising at least a schedule of a user, the personal information being registered in advance;
  - a displayer that displays, each time the prevailing processing is the background processing, an answer corresponding to the transmitted personal information when the answer is received from the server, the answer comprising push information correlating to the schedule of the user; and
  - a setter that sets, when the answer is displayed on the client terminal, an input operation of the client terminal that normally switches the prevailing processing, that was switched to the background processing, to the prevailing processing to connect the client terminal with the push information of the answer and to not switch the prevailing processing, that was switched to the background processing, to the prevailing processing, and
- the server communicates with the client terminal through a network, the server comprising:
  - a receiver that receives the personal information transmitted from the client terminal;
  - a selector that selects the push information, the push information correlating to the schedule of the user;
  - a collector that collects the push information selected by the selector, through the network; and
  - an answerer that transmits the push information collected by the collector, as the answer to the client terminal,
- wherein the schedule comprises a daily schedule indicating actions of the user, and the push information correlates to each of the actions of the daily schedule.

17. The information servicing system of claim 16, wherein the personal information further comprises user preference data indicating preferences of a user, and the push information correlates to each of the preferences on the basis of the schedule.

18. The information servicing system of claim 16, wherein the client terminal simultaneously displays push information of a plurality of answers when the plurality of answers are received from the server.

19. The information servicing method of claim 1, further comprising:
- determining, each time the prevailing processing is the background processing, whether a predetermined idle time period has elapsed since the prevailing processing was switched to the background processing;
- retransmitting the personal information to the server each time it is determined that the predetermined idle time period has elapsed; and
- displaying, on the client terminal, an updated answer corresponding to the retransmitted personal information when the updated answer is received from the server, each time the prevailing processing is the background processing.

20. The recording medium of claim 8, wherein the program further executes, under the control of the client terminal:
- to determine, each time the prevailing processing is the background processing, whether a predetermined idle time period has elapsed since the prevailing processing was switched to the background processing;
- to retransmit the personal information to the server each time it is determined that the predetermined idle time period has elapsed; and
- to display, on the client terminal, an updated answer corresponding to the retransmitted personal information when the updated answer is received from the server, each time the prevailing processing is the background processing.

21. The information servicing system of claim 16, wherein the client terminal further comprises:
- an idle determiner that determines, each time the prevailing processing is the background processing, whether a predetermined idle time period has elapsed since the prevailing processing was switched to the background processing; and
- a retransmitter that retransmits the personal information to the server each time it is determined that the predetermined idle time period has elapsed,
- wherein the displayer displays, on the client terminal, an updated answer corresponding to the retransmitted personal information when the updated answer is received from the server, each time the prevailing processing is the background processing.

22. The information servicing system of claim 16, wherein the schedule of the user indicates scheduling data allowed by the schedule, and the push information correlates to the scheduling data.

* * * * *